April 21, 1970 AKIRA ASAHI ET AL 3,507,764
METHOD OF REFINING GLYOXAL
Filed April 10, 1967

INVENTORS
AKIRA ASAHI
MASAYUKI MAEHARA
MASAMI SAKOW

United States Patent Office 3,507,764
Patented Apr. 21, 1970

3,507,764
METHOD OF REFINING GLYOXAL
Akira Asahi, Masayuki Maehara, and Masami Sakow, Arai-shi, Japan, assignors to Daicel Ltd., Osaka, Japan, a corporation of Japan
Filed Apr. 10, 1967, Ser. No. 629,543
Claims priority, application Japan, Apr. 15, 1966, 41/23,885
Int. Cl. B01d 13/02
U.S. Cl. 204—180       12 Claims

ABSTRACT OF THE DISCLOSURE

A method of refining glyoxal in which an aqueous solution of glyoxal is subjected to electrodialysis using ion exchange membranes.

BACKGROUND OF THE INVENTION

Field of the invention

This invention relates to a method of refining an aqueous solution of glyoxal.

More particularly the present invention relates to a method of refining an aqueous solution of glyoxal to obtain high quality glyoxal of a reduced content of impurities by electrically dialyzing a crude aqueous solution of glyoxal employing ion exchange membranes.

Still more particularly the present invention relates to a method of refining an aqueous solution of glyoxal efficiently at a high yield by first removing preferably at least a part of the volatile ingredients contained in the crude aqueous solution of glyoxal obtained specifically by oxidation of acetaldehyde with nitric acid. The solution is then electrically dialyzed using ion exchange membranes.

Description of the prior art

Methods of synthesizing glyoxal by oxidation of acetaldehyde with nitric acid are well known and are mentioned, for example, in Ber. 10 1311 (1877), German Patent No. 573,721, British Patent No. 653,588, United States Patent No. 2,599,335, and Japanese patent publication No. 7,657/1951. An aqueous solution of glyoxal produced by such a method contains not only such impurities as acetaldehyde and nitric acid which are unchanged raw materials but also such volatile acids as formic acid and acetic acid, such slightly volatile acids as glyoxylic acid and oxalic acid, such by-products as formaldehyde and, in some cases, such inorganic electrolytes as a metallic ion or nitrous acid. Such impurities will themselves reduce the purity of the product and will not only become obstacles to the use thereof, but will also color the glyoxal solution during the period of storage or use and will remarkably impair the quality of the product.

Various methods of refining a crude aqueous solution of glyoxal are already known, for example, a method wherein particularly volatile ingredients are removed by distilling or concentrating the solution (Japanese patent publications No. 6,163/1963 and 25,132/1965), a method wherein acids are neutralized and removed with such basic substances as calcium carbonate (German Patent No. 1,154,081), a method wherein acids are removed by treating the solution with an anion exchange resin (German Patent No. 1,154,081), a method wherein high boiling point impurities are removed by partial condensation of the vapor obtained by heating and depolymerizing the solution of polymeric glyoxal hydrates in p-dioxano(b)-p-dioxane (United States Patent No. 2,463,030) and a method wherein glyoxal is acetalized, rectified and then hydrolyzed (Russian Patent No. 168,670). However, these methods are generally not completely satisfactory because the operation is complicated, various secondary raw materials must be consumed and a sufficient refining effect cannot always be expected.

SUMMARY OF THE INVENTION

As a result of making various investigations of methods of refining glyoxal, we have discovered a method of refining a crude glyoxal solution by carrying out an electrodialysis of the crude glyoxal solution employing ion exchange membranes. This is an entirely new method distinct from any of the conventional methods. We have succeeded in obtaining glyoxal of very high purity, at a high yield, by removing almost all of the impurities.

The present invention provides a method of refining glyoxal by removing impurities by electrodialyzing, using ion exchange membranes, an aqueous solution of glyoxal containing at least one or more kinds of electrolytes as impurities. An aqueous solution of glyoxal obtained particularly by oxidation of acetaldehyde with nitric acid can be refined by this method. However, the present invention can also be applied to impure aqueous solutions of glyoxal produced by other methods. By using the method of the present invention, not only organic acids and other electrolytic impurities can be removed but also such nonelectrolytes as formaldehyde and acetaldehyde can be removed. Further, coloring substances which are usually contained in crude glyoxal and whose ingredients are not known and substances which cause coloring during the use or storage of glyoxal can be removed at the same time. Therefore, glyoxal of high quality can be obtained using the present invention. The present invention makes it possible to refine crude aqueous glyoxal solutions by removing various impurities contained therein rapidly and in a single operation of electrodialysis using ion exchange membranes, thereby obtaining an excellent result.

BRIEF DESCRIPTION OF THE DRAWINGS

In the accompanying drawings.

DESCRIPTION OF THE PREFERRED EMBODIMENT

The method of the present invention is particularly adapted to be carried out on a crude aqueous glyoxal solution obtained by oxidation of acetaldehyde with nitric acid as described above. Therefore, the refining of such a solution shall be referred to in the following description. In such case, the solution obtained may be treated as it is. It is preferable, however, to first remove a part of the impurities by any of the well-known refining methods and then carry out the electrodialysis employing ion exchange membranes as described above.

Figure 1:
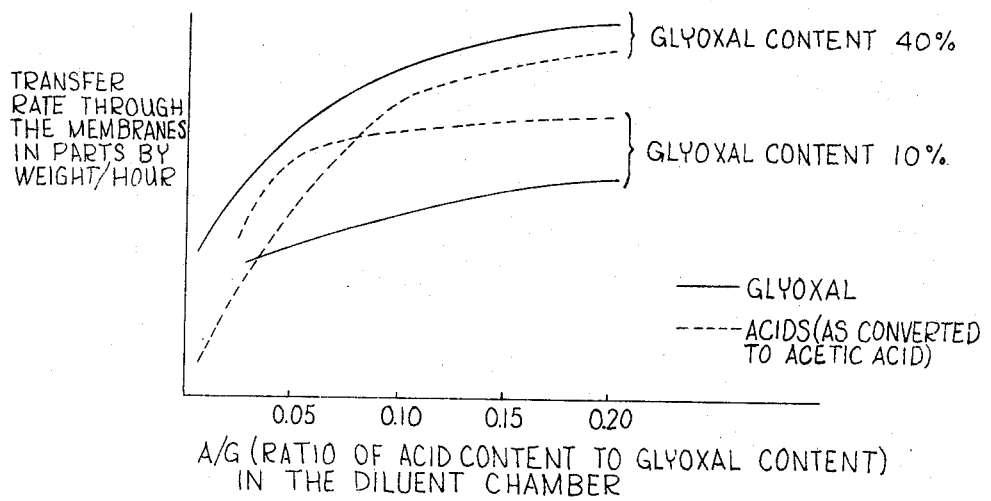
FIGURE 1 is a graph comparing the transfer rate of acids and that of glyoxal through membranes.

The reason for this is as follows. We have discovered that, in the case of electrodialyzing a crude aqueous solution of glyoxal by employing ion exchange membranes, the presence of organic acids as impurities in the aqueous solution will have a substantial influence on the amount of loss of glyoxal and on the capacity of the electrodialysis cell. FIGURE 1 shows a graph of the results of experiments which show the relation between the transfer rates of glyoxal and organic acids through a membrane. This also shows the ratio ($A/G$) of the concentration of acids to that of glyoxal in a diluent chamber. As is evident from this graph, the transfer rates of the glyoxal and the acids through the ion exchange membrane vary with the concentrations of the glyoxal and the acids. The higher the concentration of the acids, the higher the transfer rates. Further, when the concentration of the acids is high, for example, if the ratio of the acids to the glyoxal is more than 0.2, the ratio of both velocities will be in a range of 1+0.2. Thus, it has been found that glyoxal in an amount substantially comparable to the amount of the acids to be removed by the dialysis will be transferred and lost. A solution obtained by oxidation of acetaldehyde with nitric acid usually contains acids in an amount of from about 0.6 to 1.2 times as large as that of glyoxal. Therefore, if the solution is electrically dialyzed as it is, with the acids present, the loss of the glyoxal will become large, thus decreasing the yield of purfied glyoxal.

In the present method, it is advantageous to use a solution that has first been refined by a known conventional refining method wherein a part of the impurities and specifically the acids, therein are removed such as by the above-described distillation method, neutralizing method, ion exchange resin method, depolymerizing method or acetalizing method. The most desirable method comprises removing the volatile substances by evaporation or distillation under a reduced pressure or atmosphere pressure. Such a method is simple in operation, can recover and utilize acetaldehyde and is therefore more advantageous than any other complicated refining method.

In a crude aqueous solution of glyoxal, preferably thus pretreated the concentration of glyoxal may vary in a wide range depending on the existing conditions and the type of pretreatment. However, if the glyoxal concentration is so high as to be, for example, more than 60%, the solution will be low in the fluidity and will be difficult to handle. Therefore, it is desirable to electrically dialyze the aqueous solution in which the glyoxal concentration is less than about 50%. Further, if the concentration of glyoxal is high, the influence of the diffusion dialysis will be great. As evident also in the above-described FIGURE 1, the amount of glyoxal lost through the membrane will be large. This would make it preferable that the concentration of glyoxal be lower. However, if the cost of the concentrating step required after the refinement is taken into consideration, it will be preferable that the concentration of glyoxal be as high as possible. Therefore, the concentration of glyoxal in the solution to be treated should be determined generally by taking into consideration the kind and degree of the pretreatment and the degree of the refinement required to be attained in the electrodialysis. Generally, the proper glyoxal concentration will be between about 2 and 45%.

In practicing the present invention, it is generally disadvantageous to entirely omit the pretreatment. At least a pretreatment, such as distillation or concentration should be carried out. No other pretreatment is necessarily required, but in case an additional pretreatment is carried out, the burden on the electrodialysis process will be that much reduced.

Figure 2:
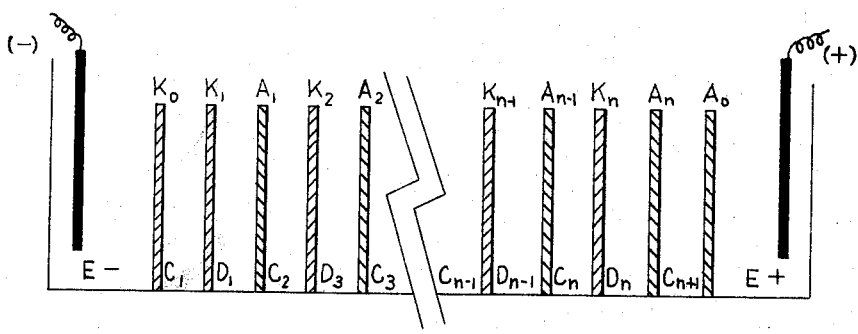
FIGURE 2 is a schematic illustration of an electrodialysis cell for use in the present invention.

The electrodialysis apparatus used in practicing the present invention is generally formed of a plurality of chambers separated by known ion exchange membranes. They are divided into chambers (hereinafter called "diluent chambers") from which electrolytic ions are removed and diluted during the electrodialysis, chambers (hereinafter called "concentration chambers") into which the electrolytic ions are transferred and concentrated and electrode chambers. An example of such apparatus is shown in FIGURE 2. In FIGURE 2, membrane A is an anion exchange membrane, membrane K is a cation exchange membrane, D is a diluent chamber, C is a concentration chamber and E is an electrode chamber. Subscript numerals 0, 1, 2 ... $n-1$ and $n$ (wherein $n$ is an integer larger than 0) designate the respective numbers of the membranes or chambers. However, this is only an example. Various modifications are possible. For example, the membranes $A_0$ and $K_0$ may be replaced with each other or their numbers may be increased or decreased. Further, the electrode chambers can be also concentration chambers or diluent chambers. Further, a solution circulating pump or the like may be provided for each chamber or commonly for several chambers.

If the present invention is carried out employing such an apparatus or cell as is mentioned above, the fundamental operating process consists of putting an aqueous solution of glyoxal containing impurities into the diluent chambers, putting water into the concentration chambers and electrode chambers and providing an electrical potential difference between the electrodes.

The concentration of such electrolytes as the organic acids and the other electrolytes in the diluent chamber will be gradually reduced by a well-known principle. However, in such case, such nonelectrolytes as formaldehyde and acetaldehyde and the coloring ingredients will also simultaneously pass through the membrane by diffusion and electroosmosis, will move into the concentration chamber and by a reason not fully understood, will be removed from the diluent chamber. Meanwhile a part of the glyoxal will also move into the concentration chamber through the membrane but the amount thereof can be limited so as not to be economically disadvantageous. Thus, an aqueous solution of glyoxal low in impurities will be obtained in the diluent chamber without causing any remarkable loss of glyoxal.

Any ion exchange membrane which is usually used in electrodialysis procedures and whose fine pores are in a range of sizes such as can easily pass the molecules or ions of the impurities to be removed can be used in the method of the present invention. However, the permeability of anion exchange membranes to acids and glyoxal vary substantially depending on the type. Therefore, an anion exchange membrane whose velocity of permeation is high with acids but is low with glyoxal should be selected for use from among the available membranes.

The operating conditions for the electrodialysis shall now be explained.

Generally electrodialysis using ion exchange membranes is carried out below the limiting current density.

The limiting current density for an aqueous solution of glyoxal is compartively small but not so definite as in the case of an ordinary inorganic electrolyte. The impressed voltage corresponding to it will be in a range of about 1 to 1.5 v. per pair of membranes, if the distance between membranes is about 1 to 2 mm. From experience, the preferable impressed voltage is less than 1.5 v. per pair of membranes, but higher voltages may be adopted. If the impressed voltage is elevated, the transfer rate of the acids will increase substantially linearly but the transfer rate of glyoxal will not increase as much. Therefore, it is advantageous to make the impressed voltage as high as possible. However, if it is made higher than 2.5 v. per pair of membranes, concentration polarization will occur and the deterioration of the membranes will be remarkably accelerated.

It is also one of the advantages of the method of the present invention that, in the case of continuous operation, by varying the impressed voltage, the degree of precision or the treating capacity can be freely controlled.

The transfer rate of the substance through the membrane will be influenced not only by the composition of the diluent chamber solution and the impressed voltage but also by the composition of the concentration chamber solution or the difference between the concentrations in the diluent chamber and concentration chamber.

The transfer rate of acids will be greatly influenced mostly by the electrical driving force. However, in order to remove acids efficiently enough, it is desirable to keep the ratio of the acid concentration in the diluent chamber to that in the concentration chamber above 1/10. For this purpose, even in the case of a batch operation, it is effective to continuously or intermittently replace a part of the solution in the concentration chamber with water.

In case only water is put into the concentration chamber at the beginning of the batch operation, the electrical resistance in the concentration chamber will be so high that electric current will hardly flow. Further, in some cases, the electrical resistance of the electrode chamber solution will become high not only in the initial period of the batch operation but also depending on the kind of the membrane in contact with the electrode chamber. In order to improve this point, it is effective to add a proper amount (about 0.1 to 1 N concentration of the electrolyte) of an inorganic electrolyte, such as sodium chloride or sodium sulfate, an organic electrolyte, such as acetic acid or the crude glyoxal solution or to use the concentration chamber solution or the electrode chamber solution of the preceding batch.

In order to effectively carry out the electrodialysis, it is preferable to keep the solution in a turbulent state, particularly, in the case of the diluent chamber solution. Usually the solution is forced to circulate so that the linear velocity may be more than one cm./sec. However, when the flow velocity becomes high, the loss of glyoxal by diffusion dialysis will also increase. Therefore, the flow velocity should be kept as low as is required for the prevention of the concentration polarization.

Any means generally adopted to make the distribution of the solution favorable and to keep a uniform fluid state on any part of the membrane surface can be effectively utilized.

The method of refining a crude aqueous solution of glyoxal containing impurities according to the present invention does not require a regenerating step, such as is required in the known conventional refining method with an ion exchange resin, and, therefore, has an advantage in that it can be continuously carried out. For example, if a crude aqueous solution of glyoxal is continuously fed in simultaneously with continuously extracting the solution in the diluent chamber and, on the other hand, water is continuously fed in simultaneously while continuously extracting the solution in the concentration chamber, a refined aqueous solution of glyoxal of a desired composition and an aqueous solution of impurities can be continuously obtained. An example of this shall be explained in a later-mentioned example.

If the aqueous solution of glyoxal obtained by the method of the present invention is somewhat colored due to the dialyzing conditions and such after treatment concentration, an active carbon treatment should be carried out as required. Further, as the solution obtained from the concentration chamber contains some glyoxal and useful organic acids, it may be again dialyzed to recover glyoxal or acids. The recovered glyoxal or acids, or in some cases, the concentration chamber solution itself may be effectively utilized.

In the examples described below, the parts are all by weight and the composition percentages (percent) are by weight unless otherwise specified.

EXAMPLE 1

An electrodialysis cell provided with 11 cation exchange membranes (Selemion CMV produced by Asahi Glass Co., Ltd.) and 11 anion exchange membranes (Selemion AMT produced by Asahi Glass Co., Ltd.) were installed according to the arrangement illustrated in FIGURE 2. An anode made of carbon and a cathode made of stainless steel were provided. Solution circulating tanks common respectively to the diluent chambers, concentration chambers and electrode chambers and circulating pumps for each were provided.

When acetaldehyde was oxidized using nitric acid according to the method mentioned in Japanese Patent No. 311,420 (publication No. 9,261/1963), there was obtained a reaction product containing 8.6% glyoxal, 8.2% organic acids (as converted to acetic acid), 1.1% nitric acid and 15.6% acetalydehyde and formaldehyde. Two thousand parts of this solution were put into the solution circulating storage tank of the diluent chambers of the above-mentioned electrodialysis apparatus. Two thousand parts of water were put into the solution circulating storage tank of each of the concentration chambers and electrode chambers. An electrical potential of 14 to 15 v. was produced between both electrodes while circulating the solutions in the respective chambers with the circulating pumps. When an electrodialysis was carried out for 20 hours while keeping the acid concentration in the concentration chambers less than 10 times as high as that in the diluent chambers by oscasionally replacing a part of the solution in the concentration chambers, there were obtained 1775 parts of an aqueous solution composed of 5.0% glyoxal, 0.10% acids and 0.5% acetaldehyde and formaldehyde as the diluent chamber solution. The percent of removal of the acids and acetaldehyde were respectively more than 98%. The yield of glyoxal in the diluent chambers was 58%.

When this solution was concentrated under a pressure of 100 mm. Hg to a concentration of 40% glyoxal and was treated with active carbon, refined glyoxal was obtained. The analysis values of this product and the reults of its stability test and alkali test are shown in the following Table 2 together with those of the other examples.

In Table 2, the stability test measures the color number (APHA) and the percent transmittancy ($T_{350}$) at a wavelength of 350 m$\mu$ before and after heating 40 ml. of a sample of an aqueous solution of glyoxal at 80° C. for six hours and is a measure of the coloration of the product during the period of storage or use. The alkali test measures the color number (APHA) and the percent transmittancy ($T_{350}$) at a wavelength of 350 m$\mu$ before and after heating at 80° C. for six hours of an aqueous solution of glyoxal prepared by adding an aqueous solution of caustic soda of 1 N to 20 ml. of a sample of glyoxal so as to adjust the pH to 7.0 and diluting it to 40 ml. with water and is a measure of coloring in the case of using glyoxal under alkaline conditions.

EXAMPLE 2

The same reaction product as in Example 1 was first concentrated to a glyoxal concentration of 50% and a ratio of acids to glyoxal of about 20% under a pressure of 100 mm. Hg and such volatile ingredients as acetaldehyde and acetic acid were distilled away to obtain a concentrated aqueous solution of glyoxal. Three kinds of charge material solutions *a*, *b* and *c* of different glyoxal concentrations were prepared by diluting separate quantities of the solution with water.

Experiments were carried out in which the diluent chamber solution circulating storage tank in the same apparatus as in Example 1 was charged with the respective material solutions so that the net amount of glyoxal for each experiment was about 700 parts. In each experiment, the concentration chambers and electrode chambers each were charged with substantially the same amount of water as the material solution. An electrodialysis was carried out with a cell voltage of 15 v. for 20 hours while circulating the solution to each chamber with the circulating pumps. The composition of each chamber solution before and after the electrodialysis, the yield of glyoxal in each diluent chamber solution and the electric current efficiency on the removed acids for each experiment are shown in Table 1.

Comparing the results obtained using solution *c* with the results of Example 1 in which the glyoxal concentration was substantially the same, it is found that, in this example in which the volatile impurities were removed in advance, when about four times as much glyoxal was treated within the same period of time, a diluent chamber solution of a lower ratio of acids to glyoxal was obtained and the yield of glyoxal in the diluent chamber solution was far higher.

TABLE 1

| Example No. | Material charge in parts | Composition of the diluent chamber before→and after the dialysis | | | |
|---|---|---|---|---|---|
| | | Glyoxal in percent | Acid in percent [1] | Formaldehyde in percent | Iron in p.p.m. |
| 2a | 1,936 | 36.2→27.6 | 7.25→0.86 | 1.08→0.07 | 24.3→0.3 |
| 2b | 4,230 | 17.3→15.5 | 3.36→0.29 | 0.47→0.03 | 15.4→0.1 |
| 2c | 6,280 | 10.6→9.1 | 2.07→0.07 | 0.32→0.01 | 7.8→0.1 |

| Example No. | Concentration chamber solution after the dialysis | Diluent chamber solution after the dialysis | | |
|---|---|---|---|---|
| | Glyoxal in percent | Acid in percent | A/G (percent) [2] | Yield of glyoxal in percent | Current efficiency in percent |
| 2a | 10.6 | 6.74 | 3.1 | 68 | 82 |
| 2b | 3.0 | 2.65 | 1.9 | 78 | 61 |
| 2c | 1.55 | 1.55 | 0.8 | 78 | 68 |

[1] The acids are of value as converted to acetic acid.
[2] A/G is a ratio of acids (as converted to acetic acid) to glyoxal.

EXAMPLE 3

When acetaldehyde was oxidized with nitric acid according to the method mentioned in the specification of German Patent No. 952,083, there was obtained a crude solution containing 10.9% glyoxal, 7.4% organic acids (as converted to acetic acid), 17.8% acetaldehyde and formaldehyde and 0.4% nitric acid. It was concentrated under a pressure of 50 mm. Hg until the concentration of glyoxal became about 60% and such volatile ingredients as acetaldehyde and acetic acid were distilled away to obtain a very viscous concentrated aqueous solution of glyoxal. This solution was diluted with water to adjust the concentration to 40% and was used as a charge material solution for electrodialysis.

In the same electrodialysis apparatus as used in Example 1, the diluent chamber solution circulating storage tank was charged with 2000 parts of the material solution, the concentration chambers and electrode chambers were each charged with 2000 parts of the material solution diluted to 50 times its volume with water and an electrodialysis was carried out with a cell voltage of 15 v. for 20 hours while circulating the solution to each chamber with the circulating pumps. Then, the glyoxal concentration of the solution in the diluent chamber was adjusted to 40% and the solution was treated with active carbon to obtain a refined aqueous solution of glyoxal. The results of the same analyses and quality tests as are mentioned in Example 1 made on the material solution and product glyoxal of this example together with those of the other examples are shown in Table 2.

Control 1

Five hundred parts of the electrodialysis material solution mentioned in Example 3 were treated with active carbon and were subjected to the same analyses and quality tests as are mentioned in Example 1. The results are shown in Table 2.

Control 2

Two thousand parts of the electrodialysis material solution in Example 3 were treated with an anion exchange resin and cation exchange resin according to the method mentioned in the specification of German Patent No. 1,154,031 and Japanese Patent No. 311,420, then the glyoxal concentration was adjusted to 40% and the solution was treated with active carbon to obtain refined glyoxal. The results of the same analyses and quality tests as are mentioned in Example 1 made on the product are shown in Table 2.

Control 3

Thirteen hundred thirty parts of the electrodialysis material solution in Example 3 were first mixed with p-dioxano(b)-p-dioxane and were dehydrated by using toluene as an azeotropic entrainer according to the method mentioned in the specification of United States Patent No. 2,463,030 to obtain a solution of polymeric glyoxal hydrates in p-dioxano(b)-p-dioxane. When a vapor containing glyoxal, water and diluent toluene generated by depolymerizing this solution at 190° C. was fractionated and the vapor distilled out at 100° C. and quickly cooled, two liquid layers were obtained. When this lower layer was adjusted so that the glyoxal concentration was 40% and was further treated with active carbon, a refined aqueous solution of glyoxal was obtained. The same analyses and quality tests as are mentioned in Example 1 were made on this product. The results are shown in Table 2.

Control 4

In order to compare the respective examples and controls, refined glyoxal A (a commercial aqueous solution of glyoxal produced by company A) and refined glyoxal B (a commercial aqueous solution of glyoxal produced by company B) were subjected to the same analyses and quality tests as are mentioned in Example 1. The results are shown in Table 2.

EXAMPLE 4

By using the same electrodialyzing apparatus as in Example 1, the diluent chamber solution circulating storage tank was charged with 1500 parts of refined glyoxal obtained by the method mentioned in Control 2, the concentration chamber and electrode chamber solution circulating storage tanks were each charged with 1500 parts in an aqueous sodium chloride solution of 1% concentration and an electrodialysis was carried out with a cell voltage of 15 v. for four hours while circulating the solutions to the respective chambers with the circulating pumps. Then the glyoxal concentration of the diluent chamber solutions was adjusted to 40% and the solution was treated with active carbon to obtain refined glyoxal. When the product was subjected to the same analyses and quality tests as are mentioned in Example 1, the results listed in Table 2 were obtained.

EXAMPLE 5

By using the same electrodialysis apparatus as in Example 1, the diluent chamber solution circulating storage tank was charged with 1200 parts of refined glyoxal obtained by the method mentioned in Control 3 and 300 parts of water. The concentration chamber and electrode chamber solution circulating storage tanks were each charged with 1500 parts of water and an electrodialysis was carried out with a cell voltage of 15 v. for four hours. The glyoxal concentration of the diluent chamber solution was adjusted to 40% and then the solution was treated with active carbon to obtain refined glyoxal. When the product was subjected to the same analyses and quality tests as are mentioned in Example 1, the results shown in Table 2 were obtained.

EXAMPLE 6

The diluent chamber solution circulating storage tank of the apparatus in Example 1 was charged with 1500 parts of the refined glyoxal A described in Control 4. The concentration chamber and electrode chamber solution circulating storage tanks were each charged with 1500 parts of water, an electrodialysis was carried out with a cell voltage of 15 v. and a continuous operation was carried out. That is to say, the refined glyoxal obtained by the method of the above-mentioned control was continuously added to the diluent chamber solution at a rate of 300 parts per hour, water was continuously added to the concentration chamber solution at a rate of 300 parts per hour and the solutions were continuously extracted from both chambers so that the levels in both chamber solution circulating tanks were kept constant. The glyoxal concentration of the solution extracted from the diluent chamber solution circulating tank was adjusted to 40% and the solution was treated with active carbon to obtain refined glyoxal. This product was subjected to the same analyses and quality tests as are mentioned in Example 1. The results are shown in Table 2.

constant. Then, in the same manner, the solution is transferred from the tank 2D to the tank 3D and the final refined solution is extracted out of the system from the tank 3D. For the concentration chamber solution, water is continuously fed into the tank 3C and is transferred to the tank 1C through the tank 2C in the same manner as the diluent chamber solution and a waste solution is continuously extracted out of the tank 1C.

TABLE 2

| Example and Control No. | Composition in percent | | | Stability test [2] | | Alkali test [3] | |
|---|---|---|---|---|---|---|---|
| | Glyoxal | Acids [1] | Formaldehyde | APHA | $T_{350}$ (percent)[3] | APHA | $T_{350}$ (percent) [2] |
| Example 1 | 40.3 | 0.48 | 0.05 | 10→20 | 95.0→75.5 | 30→60 | 82.0→62.5 |
| Example 3—Charge material solution | 40.0 | 6.37 | 1.25 | 50→150 | 30.2→16.3 | 100→2,000 | 5.0→1.5 |
| Example 3—Refined product | 40.8 | 0.24 | 0.05 | 10→10 | 95.2→80.0 | 20→40 | 84.7→66.0 |
| Control 1 | 40.1 | 6.34 | 1.10 | 20→120 | 55.5→20.1 | 90→1,500 | 10.4→1.9 |
| Control 2 | 40.1 | 1.23 | 0.36 | 10→20 | 90.0→71.5 | 20→150 | 72.5→25.2 |
| Control 3 | 40.0 | 0.99 | 0.02 | 10→40 | 92.3→69.9 | 70→90 | 73.0→43.8 |
| Control 4-A | 40.2 | 1.16 | 0.30 | 10→20 | 85.3→59.5 | 20→200 | 64.1→15.0 |
| Control 4-B | 40.2 | 0.62 | 0.17 | 50→350 | 46.5→5.0 | 100→500 | 42.5→6.5 |
| Example 4 | 40.8 | 0.19 | 0.04 | 10→10 | 97.5→87.5 | 30→60 | 79.5→53.0 |
| Example 5 | 40.5 | 0.27 | 0.01 | 10→20 | 95.4→78.4 | 20→50 | 80.7→64.1 |
| Example 6 | 40.5 | 0.15 | 0.03 | 10→15 | 97.2→76.0 | 10→60 | 88.5→62.0 |

[1] The acids are of values as converted to acetic acid.
[2] The results of the stability test and alkali test are represented by the values before heating→and the values after heating.
[3] $T_{350}$ is represented by percent transmittancy at 950 mμ.

EXAMPLE 7

Twenty two hundred parts of an aqueous solution of glyoxal obtained in the same manner as in Example 2 and containing 20.0% glyoxal and 3.20% acids were electrically dialyzed with a cell voltage of 20 v. and was refined until the acid in the diluent chamber became less than 0.2%. Further, by changing the kind of the ion exchange membranes, the same operation was repeated. The time required for each electrodialysis, the composition of each chamber solution after the dialysis and the yield of glyoxal in the diluent chamber are shown in Table 3.

As a charge material solution, an aqueous solution of glyoxal of a concentration of about 13% obtained in the same manner as in Example 2 was fed at a rate of 1000 parts per hour. Water was also fed at a rate of 1000 parts per hour. As an electrode chamber solution, 2000 parts of water were fed into the circulating tank at the beginning of the operation. An electrodialysis was carried out by providing a direct current voltage of 15 v. between the electrodes in each dialysis cell while circulating each chamber solution with pumps. Each chamber composition was stabilized in about 20 hours and then a continuous operation was made for about 100 hours. The composition

TABLE 3

| Example No. | Cation exchange membrane | Anion exchange membrane | Required time in hours | Diluting chamber composition in percent | | Concentrating chamber composition in percent | | Yield of glyoxal in percent |
|---|---|---|---|---|---|---|---|---|
| | | | | Glyoxal | Acids | Glyoxal | Acids | |
| 7a | CMV | AMT | 10.0 | 17.0 | 0.15 | 2.8 | 3.10 | 88 |
| 7b | CMV | AST | 13.5 | 18.8 | 0.18 | 1.2 | 3.00 | 93 |
| 7c | CMV | Experimental article. | 7.5 | 18.6 | 0.13 | 1.4 | 3.12 | 93 |
| 7d | CSG | AMT | 10.5 | 17.2 | 0.18 | 2.5 | 3.04 | 89 |

NOTE.—The names of the ion exchange membranes in the table are trade names of products of Asahi Glass Company, Ltd.

EXAMPLE 8

Figure 3:
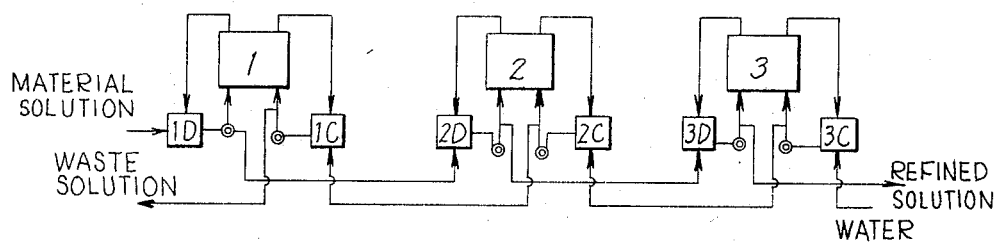
FIGURE 3 is a flow diagram of a preferred embodiment of the present invention.

In FIGURE 3 is shown a flow diagram of the apparatus used in this example. In the drawing, 1, 2 and 3 are electrodialyzing cells each having 11 anion exchange membranes (AMT) and 11 cation exchange membranes (CMV). Each dialysis cell is provided with a diluent chamber solution circulating system provided with a tank represented by 1D, 2D and 3D and a circulating pump, a concentrating system provided with a tank represented by 1C, 2C or 3C and a circulating pump and an electrode chamber solution circulating system, though not illustrated in the drawing, which is common to all dialysis cells.

For the diluent chamber solution, a charge material solution to be refined is continuously fed into the tank 1D. The solution in the tank 1D is continuously fed into and is refined in cell 1, and the refined solution is continuously removed from cell 1 and is fed into the tank 2D while keeping the amount of the solution in the tanks of the solution in each chamber in each dialysis tank in the state operation is shown in Table 4.

TABLE 4

| | Charge material solution | First tank | Second tank | Third tank |
|---|---|---|---|---|
| Diluent chamber: | | | | |
| Glyoxal in percent | 13.1 | 12.9 | 12.7 | 12.3 |
| Acids in percent | 1.62 | 0.90 | 0.43 | 0.20 |
| Concentration chamber: | | | | |
| Glyoxal in percent | | 0.90 | 0.70 | 0.40 |
| Acids in percent | | 1.47 | 0.78 | 0.28 |

As a whole, the yield of glyoxal was 88% and the current efficiency was 88%.

As is evident from the above-described examples and controls, it is easily possible to remove organic acids and other impurities to a degree which has been hard to attain with any known conventional methods. As a result, the coloring of the products will be reduced during the storage and at the time of the use.

Further, it is evident that, when volatile impurities are removed prior to the electrodialysis and/or a part of the impurites is removed in advance by carrying out any other known refining method, it will be possible to reduce the time required for the dialysis or to increase the treating capacity within the same time.

Although a particular preferred embodiment of the invention has been described above in detail for illustrative purposes, it will be recognized that variations or modifications of such disclosure, which lie within the scope of the appended claims, are fully contemplated.

The embodiments of the invention in which an exclusive property or privilege is claimed are defined as follows.

1. A method of obtaining an aqueous solution of glyoxal containing a reduced amount of impurities using an electrodialysis apparatus comprising diluent chamber means and concentration chamber means defined by alternate anion and cation exchange membranes and having electrode chambers containing electrodes, which comprises (1) feeding into the diluent chamber means of the electrodialysis apparatus an aqueous solution of glyoxal obtained by oxidation of acetaldehyde with nitric acid, which solution contains electrolytes, nonelectrolytes and coloring substances as impurities; (2) feeding water into the concentration chamber means and the electrode chambers of said electrodialysis apparatus; (3) applying an electrical potential difference between the electrodes of said electrodialysis apparatus to effect electrodialysis of said solution whereby a relatively large proportion of said impurities is transferred into said concentration chamber means; and (4) recovering from the diluent chamber means an aqueous solution of glyoxal containing a reduced amount of impurities.

2. The method as defined in claim 1, including the step of distilling away at least a part of the volatile substances contained in the aqueous solution of glyoxal prior to feeding said solution into said electrodialysis apparatus.

3. The method as defined in claim 1, including the step of removing a part of the impurities contained in the aqueous solution of glyoxal with an anion exchanger or a cation exchanger prior to feeding said solution into said electrodialysis apparatus.

4. The method as defined in claim 1, including the step of removing a part of the impurities prior to feeding said solution into said electrodialysis apparatus by removing water from the aqueous solution of glyoxal to be treated to make it a glyoxal hydrate polymer, depolymerizing said polymer to obtain a glyoxal monomer and again making an aqueous solution of said monomer.

5. The method as defined in claim 1, including the step of removing as an alkaline earth metallic salt a part of the impurities contained in the aqueous solution of glyoxal prior to feeding said solution into said electrodialysis apparatus.

6. The method as defined in claim 1, wherein the concentration of the aqueous solution of glyoxal during the electrodialysis is less than 45% by weight.

7. The method as defined in claim 1, wherein the concentration of the aqueous solution of glyoxal during the electrodialysis is between 2 and 30%.

8. The method as defined in claim 1, including the step of maintaining the concentration of the electrolytes in the concentration chamber means of the electrodialysis apparatus less than 10 times as high as that in the diluent chamber means.

9. The method as defined in claim 1, wherein the electrodialysis is continuously carried out by feeding the aqueous solution of glyoxal into the diluent chamber means and feeding water into the concentration chamber means in the electrodialysis apparatus so that there may be continuously obtained in aqueous solution of glyoxal of a low content of impurities from the diluent chamber means and an aqueous solution of glyoxal of a high content of impurities from the concentration chamber means.

10. The method as defined in claim 9, which is carried out using at least two dialysis apparatuses while transferring the concentration chamber solution and diluent chamber solution countercurrently between the respective apparartuses.

11. The method as defined in claim 1, including the further step of recovering the glyoxal and ionized substances by again electrically dialyzing the aqueous solution of glyoxal obtained from the concentration chamber means of the electrodialysis apparatus.

12. The method as defined in claim 1, wherein the electrodialysis is carried out by adding at least one electrolyte to the concentration chamber means and the electrode chamber means of said electrodialysis apparatus.

References Cited
UNITED STATES PATENTS

| | | | |
|---|---|---|---|
| 2,860,091 | 11/1958 | Rosenberg | 204—138 |
| 3,063,924 | 11/1962 | Gomella | 204—180 |
| 3,124,522 | 3/1964 | Arden et al. | 204—301 |
| 3,239,442 | 3/1966 | Tirrell | 204—180 |
| 3,290,173 | 12/1966 | Marino | 127—63 |
| 3,330,749 | 7/1967 | Kuwata et al. | 204—180 |

OTHER REFERENCES

Ionics Inc., "Stackpack," Bulletin L–2, 2nd ed., 1963.

JOHN H. MACK, Primary Examiner

A. C. PRESCOTT, Assistant Examiner

U.S. Cl. X.R.

204—301